(12) United States Patent
Geelen

(10) Patent No.: US 10,531,637 B2
(45) Date of Patent: Jan. 14, 2020

(54) PLATFORM FOR CARING AND ATTENDING PETS

(71) Applicant: Mikel-John Kuno Geelen, Madrid (ES)

(72) Inventor: Mikel-John Kuno Geelen, Madrid (ES)

( * ) Notice: Subject to any disclaimer, the term of this patent is extended or adjusted under 35 U.S.C. 154(b) by 626 days.

(21) Appl. No.: 15/111,061

(22) PCT Filed: Jan. 19, 2015

(86) PCT No.: PCT/ES2015/000006
§ 371 (c)(1),
(2) Date: Jul. 12, 2016

(87) PCT Pub. No.: WO2015/110678
PCT Pub. Date: Jul. 30, 2015

(65) Prior Publication Data
US 2016/0330929 A1 Nov. 17, 2016

(30) Foreign Application Priority Data
Jan. 21, 2014 (ES) .................................. P201400050

(51) Int. Cl.
*A01K 1/01* (2006.01)
*A01K 1/035* (2006.01)
(Continued)

(52) U.S. Cl.
CPC ............ *A01K 1/0117* (2013.01); *A01K 1/011* (2013.01); *A01K 1/0139* (2013.01); *A01K 1/035* (2013.01);
(Continued)

(58) Field of Classification Search
CPC ...... A01K 1/01; A01K 1/0117; A01K 1/0135; A01K 5/0114; A01K 5/02; A01K 5/0208;
(Continued)

(56) References Cited

U.S. PATENT DOCUMENTS 3,734,057 A * 5/1973 Lee .................. A01K 1/011
119/163
4,011,836 A * 3/1977 Temel .................. A01K 1/011
119/163
(Continued)

FOREIGN PATENT DOCUMENTS

EP 0102861 A1 3/1984
KR 1020060026382 * 3/2006 ............ A01K 1/011
(Continued)

OTHER PUBLICATIONS

International Search Report dated Mar. 25, 2015 for PCT/ES2015/000006 and English translation.

*Primary Examiner* — Joshua D Huson
(74) *Attorney, Agent, or Firm* — Lucas & Mercanti, LLP

(57) ABSTRACT

The invention relates to a platform specifically designed for caring for and attending to pets, mainly dogs, said platform comprising a device consisting of a front horizontal body and a rear vertical body which define at the intersection thereof a cavity wherein a waste-grinding spiral arranged on a grille extends transversely. The front body includes a belt for transporting stools and waste towards the area of the grinding spiral, and the rear body is hollow on the inside, the space being divided up into compartments with rear windows for accessing a feeding area and a drinking area, a compartment for holding feed, a compartment for objects for the care of the animal, a receptacle with a store of liquid disinfectant, a compartment with pumping means, and a control unit that can be accessed by the user. The device includes means for detecting waste and nozzles for spraying water towards the ground waste.

4 Claims, 4 Drawing Sheets

(51) Int. Cl.
  *A01K 5/02* (2006.01)
  *A01K 7/02* (2006.01)
  *A01K 13/00* (2006.01)
(52) U.S. Cl.
  CPC .......... *A01K 5/0275* (2013.01); *A01K 5/0291* (2013.01); *A01K 7/02* (2013.01); *A01K 13/001* (2013.01)
(58) Field of Classification Search
  CPC ...... A01K 5/0291; A01K 7/02; A01K 15/021; A01K 15/027; A01K 1/035; A01K 5/0275; A01K 13/001; A01K 1/011; A01K 1/0107; A01K 1/0139
  USPC ........ 119/51.01, 51.02, 51.13, 51.15, 58, 72, 119/163, 164, 700, 703
  See application file for complete search history.

(56) References Cited

U.S. PATENT DOCUMENTS

| | | | | |
|---|---|---|---|---|
| 4,098,229 A | * | 7/1978 | Haynes | A01K 1/0117 119/164 |
| 4,171,683 A | * | 10/1979 | Godin | A01K 1/035 119/482 |
| 5,100,127 A | * | 3/1992 | Melnick | A01K 15/027 119/700 |
| 5,433,171 A | | 7/1995 | Ewell | |
| 5,458,090 A | * | 10/1995 | Favreau | A01K 1/011 119/163 |
| 5,738,044 A | * | 4/1998 | Gaylinn | A01K 13/001 119/665 |
| 5,791,288 A | * | 8/1998 | Ehrler | A01K 1/011 119/163 |
| 6,041,737 A | * | 3/2000 | Hennigan | A01K 1/0107 119/161 |
| 6,435,136 B1 | * | 8/2002 | Segura Munoz | A01K 13/001 119/650 |
| 6,453,844 B1 | * | 9/2002 | Janzen | A01K 1/011 119/161 |
| 9,737,046 B1 | * | 8/2017 | Pugh | A01K 1/0135 |
| 2006/0144339 A1 | | 7/2006 | Walker | |
| 2010/0122662 A1 | | 5/2010 | Kennington | |
| 2017/0339911 A1 | * | 11/2017 | Fitch | A01K 1/011 |
| 2018/0014509 A1 | * | 1/2018 | Kwak | A01K 1/0114 |

FOREIGN PATENT DOCUMENTS

| | | | |
|---|---|---|---|
| WO | 2013112007 A1 | 8/2013 | |
| WO | WO-2013112007 A1 * | 8/2013 | ............. A01K 1/011 |

* cited by examiner

PLATFORM FOR CARING AND ATTENDING PETS

CROSS REFERENCE TO RELATED APPLICATION

This Application is a 371 of PCT/ES2015/000006 filed on Jan. 19, 2015, which, in turn, claimed the priority of Spanish Patent Application No. P201400050 filed on Jan. 21, 2014, both applications are incorporated herein by reference.

OBJECT OF THE INVENTION

The present invention relates to a platform for pet care and attention, which provides essential features of novelty and notable advantages over known means used for the same purposes in the current state of the art.

More particularly, the invention proposes the development of a device for pet care and attention, mainly, but not exclusively, for dogs, based on a platform that includes devices specifically designed to pay careful attention to the animal, automatically and without the need of intervention of the pet owner. The device comprises a set of means that facilitate both compliance with the physiological needs of the animal as feeding, maintenance, hygiene and cleaning in an easy and convenient way for the user.

The scope of the invention is within the industrial sector related to manufacture and marketing of devices for domestic animals, especially pets

BACKGROUND AND SUMMARY OF THE INVENTION

It is generally known that the owners and caretakers animals considered as pets, i.e. animals that normally live with their owners, especially dogs, should be cared for by their owners as far as normal and physiological activity is concerned, as well as related to other type of care (food, hygiene, vaccination, etc.) that the animal undergoes. Thus, the owner of a dog who generally lives with it in a normal home, must move variable number of times a day to any open area or some other place developed for that purpose for the animal to perform its depositions, regardless of the environmental conditions o weather conditions (cold, heat, rain, etc.) governing outside at that moment. It is therefore an obligation of the pet owner that often is inopportune or inconvenient, but it can not be left or omitted.

Despite the obligations entailed for a pet owner to maintain the animal properly, it is an obvious fact that the number of pets in homes is increasing, especially regarding dogs, given the level of company they represent and, in many cases, the great help they provide for their owners (for example, in the case of people affected physically or hampered by other problems).

To overcome the mentioned drawbacks and to provide the pet owners an environment that facilitates maintenance and care, especially in the case of dogs, with absolute guarantee of reliability and safety, the main object of the present invention is the development of a platform that incorporates a specifically designed device to provide the animal a kind of care and comprehensive attention regarding the physiological needs, waste disposal, food and hygiene for the animal.

In particular, the device incorporates a set of elements and means to facilitate the following operations:

Deposition and micturition: to prevent the owner of the animal to go outside (street, garden, etc.) at inopportune times, at unholy hours, with adverse climatic conditions, etc., to prevent the owner to have collect the excrements to discharge into the containers, litter bins or other places provided for this purpose, provision has been made for the inclusion in the structure of the platform for a belt to drag waste, with elimination of the same and subsequent automatic cleaning, combined all of this with the provision of a feed portion to encourage and accustom the animal to a correct use of the device;

Feeding: The device has programmable means to provide the animal a number of meals per day, for example from 1 to 4 meals, at specific times, and with the quantities of feed specifically programmed for each one of the meals. Preferably, the food is provided to the animal in a trough existing in the device, at the same time of the day and with the quantities metered for the dog to eat the entire quantity provided and preventing other animals such as cats, rabbits, rats, mice, ants or flies from accessing the trough of the animal potentially causing diseases by infections. Preferably the dosage of the amount of food is easily done as a function of supply time and it has been anticipated the incorporation of sensors to detect the level of feed and alert you when this level gets to a level below a default value;

Water: The dog must have fresh water available whenever possible. To do this, it is envisaged that the device integrated into the platform for the care and attention of the animal incorporates a sprue to which fresh water is poured automatically as the dog drinks it. The device also includes means programmed to rinse the bowl and completely renew the water on the sprue, to eliminate any traces of drools or other debris that may have fallen in the water, in addition to maintaining a chlorine level good enough to prevent the proliferation of bacteria and keep it in the best potability conditions possible;

Cleaning: For a correct maintenance of the hygiene of the dog, it is essential to perform a suitable cleaning every now and then. Until now, those who don not have any type of outdoor installation available, are forced to perform this operation of sanitization of the animal in the shower or bath of the house, with the resulting disadvantages this entails: Time-consuming, scratching in the bottom of the tub or shower because of nails of the animal, need to perform an afterwards sanitation of shower or bathtub, etc. The platform has been designed to wash the animal above the same by removing water automatically. The platform also incorporates a set of media to supply water, as a hose and a sprinkler conveniently shielded to protect them against damages caused by the bites of the animal or by other causes for accommodation in the interior of a compartment in the style of a small cabinet, with the particularity that these means of supplying water can also be used for the general cleaning of the device itself. In addition, the small closet-type compartment can be used simultaneously to keep other tools used for cleaning the animal, such as shampoo, brush, etc.

Concurrently with the foregoing, the invention has envisaged that the users of this type of platforms can count with appropriate information relating both to the acquisition of the machine and the maintenance of the same, with a view to enabling the user to be as self-sufficient as possible. To that end, the invention has provided for the design of a web page, accessible for all users, so they can:

Determine if the entire platform is suitable for your particular case;

To make the purchase of the machine and of the spare parts they need;

Have informative videos about how to install, connect, use, clean and maintain the platform as a whole;

Have detailed videos about how to perform, in each case, the repair of each one of the parts or devices included in the platform;

Have videos in which trained trainers teach different methods of training the dog;

Find answers to questions included in a "list of Frequently Asked Questions", and Request technical support, if it is needed.

It should be clarified at this point in the description, that the specific reference to dogs in the foregoing and in what remains of this specification has to be understood solely for the purposes of description, since although it is true that the design of the platform object of the description adapts more formally in the case of dogs, it is no less true that the versatility with which it has been conceived the same also allows its use with other types of pets.

BRIEF DESCRIPTION OF THE DRAWINGS

These and other features and advantages of the invention shall become more readily apparent from the following detailed description of an exemplary preferred embodiment thereof, given only by way of illustration and not restrictively, with reference to the accompanying drawings, wherein.

DESCRIPTION OF A PREFERRED EMBODIMENT

Figure 1:
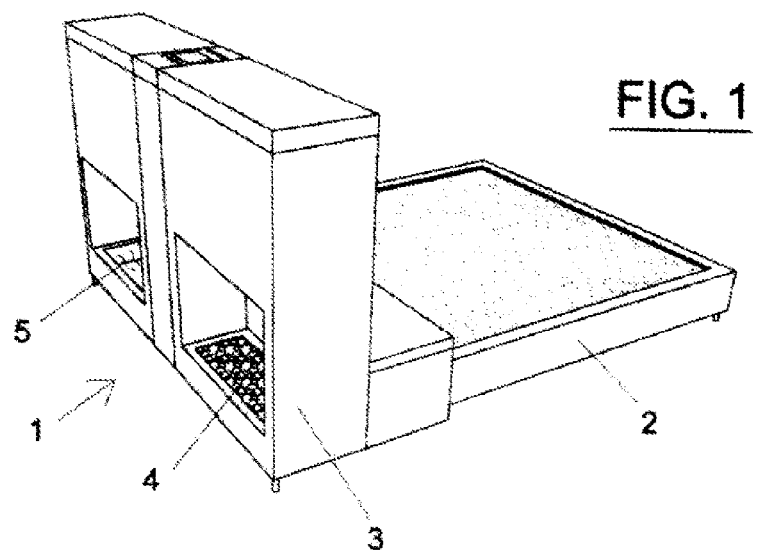
FIG. 1 is a schematic overview, rear perspective of a platform assembly for care and pet care, according to the invention.

As mentioned above, the detailed description of the preferred embodiment of the subject invention will be carried out hereinafter with the help of the accompanying drawings, through which the same reference numerals are used to designate the same or equivalent parts. Thus, first referring to FIG. 1 of the drawings, a schematic representation of a platform assembly according to the invention, indicated generally by the reference numeral 1, wherein a frame is distinguished with a front body 2 extended horizontally, which also provides the support element on any support, a rear body 3 by way of recess of parallelepiped configuration positioned vertically, with its interior space compartmented and two large open windows in the rear wall to restrict the animal access to a feeder 4 and a trough 5. The rear body 3 compartmentalized is able to incorporating multiple control and/or service elements, as will be described later.

Figure 2:
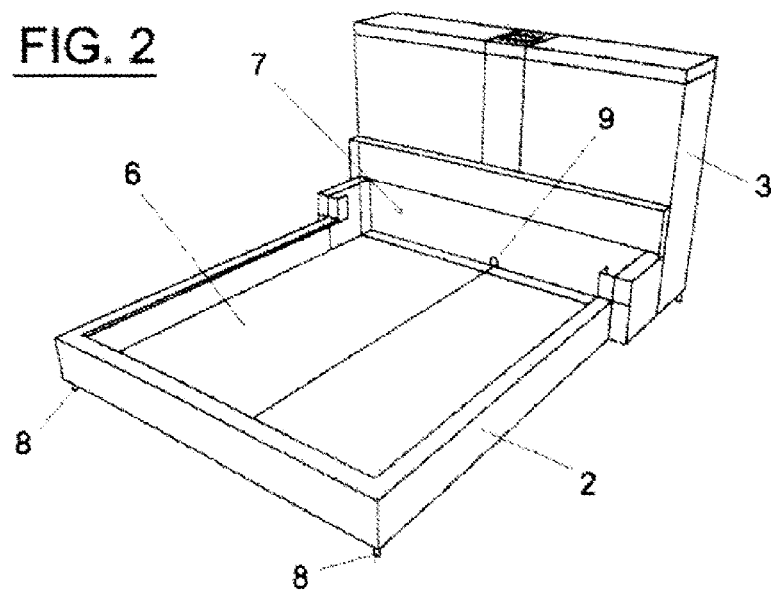
FIG. 2 is a schematic front perspective, front prospective, frame included in the platform of FIG. 1.

FIG. 2 is a schematic perspective view of the frame of the platform of the invention, taken from the front, wherein a tray 6 which constitutes the bottom of the front body is visible, and also it is visible a space, denoted generally by reference numeral 7, of preset depth, to house the grinding media as will be seen later.

The front body is preferably provided with support legs 8 with adjustable height. The regulatory capacity of the legs 8 achieves the dual purpose of, first, providing stability to the whole platform 1 and, secondly, leveling the assembly so that the tray 6, which has outstanding sloping towards the rear in order to cause the water or other liquid, inside, fall by gravity toward the space 7, from where it will be subsequently extracted with pumping means through a hole 9.

Figure 3:
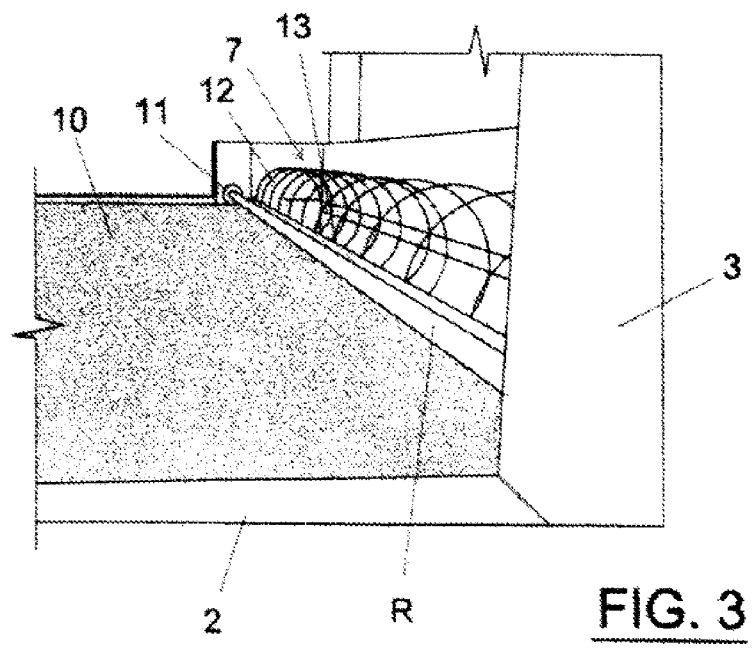
FIG. 3 shows a detail of the platform illustrative of a transporting belt incorporated therein, control infrared beam and waste grinding elements
Figure 4A:
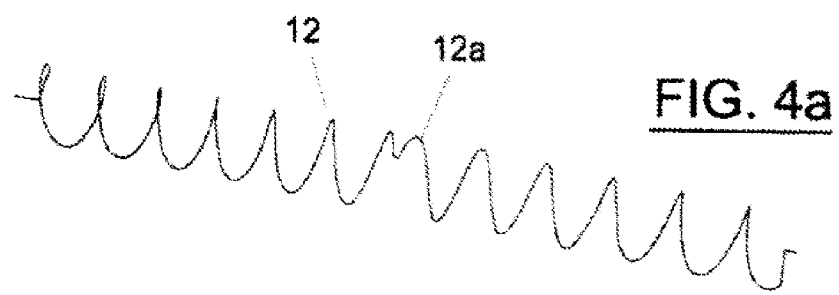
FIGS. 4a and 4b are schematic perspective views which show in greater detail the waste grinding elements incorporated in the assembly platform.
Figure 4B:
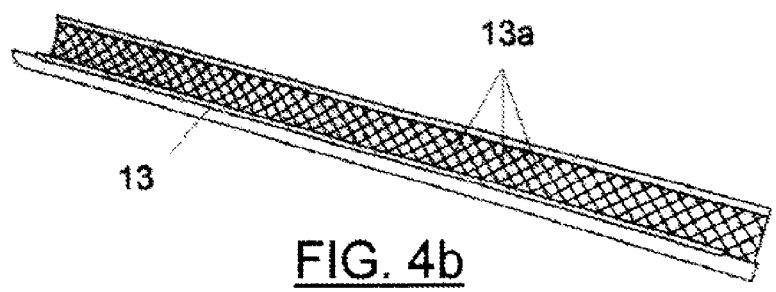

FIG. 3 shows a schematic perspective view of a rear portion associated with the bottom of platform corresponding to the space or housing 7. As it can be appreciated, inside the front horizontal body 2 there is a belt conveyor 10 extending between rotating rollers located at the ends, which fully engages the inner surface of the body 2, with automatic actuation, controlled, whose innermost end extends to a position jutting into said space housing 7, having this assembly a sensor light, by light beam, with an emitter 11 in one wall and a receiver (not visible in the drawing) in a position facing the opposite wall position, between which a light beam "R" capable of being interrupted by any body transported by the belt 10 is projected, in order to detect the presence of the latter. After the terminal end of the belt, inside the housing space 7 are located grinding media composed of a coil 12 extended in the transverse direction between the two end walls, and a grid 13 located below the coil 12, having the space bottom closed 7. FIGS. 4a and 4b allow appreciating the details that characterize both spiral elements and grid. Thus, relative to FIG. 4a, a spiral 12 divided longitudinally into two portions can be seen from a central position 12a, being each of said spirally wound portions with opposite directions. Thus, it can ensures that when rotating the spiral, the residues are transported to reach an intermediate position to effect clustering and greater grinding with intermediate portion 12a of said coil, configured in accordance with the intended purpose.

On the other hand, FIG. 4b illustrates the grid 13 as mentioned located under the coil 12, also extended transversely inside the space 7. The grid is preferably metallic or plastic in nature, in any case of rustproof material, and presents its entire surface 13a occupied with through-holes dimensioned with such a size that only particles small enough can pass, so that they can be carried by an evacuation pump.

Figure 5:
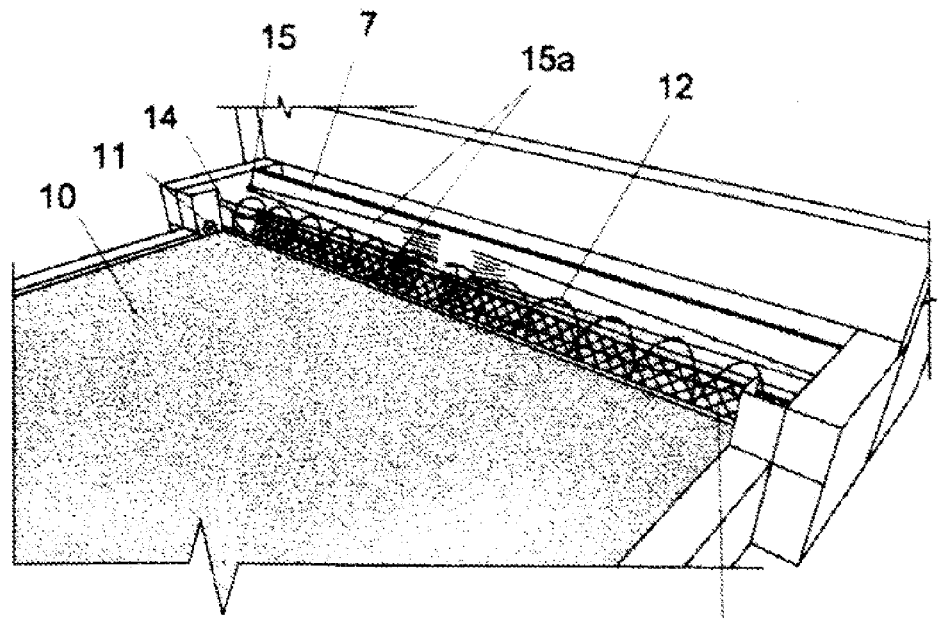
FIG. 5 is a schematic perspective view showing the cleaning and detector means associated to the grinding waste elements.

As a configuration as described above, the platform assembly adopts a form equivalent to that shown in FIG. 5 of the drawings embodiment wherein the various elements assembled are visible and ready to use. The conveyor belt 10 is preferably terminated with artificial grass, so as to provide the animal conditions that simulate a more natural environment. When an animal is positioned on the belt 10 for the purposes of carrying out a deposition or urination, a set of conventional sensors placed under the belt (not visible in the figure) detects this action and starts up the belt once the animal has abandoned the device. If after a fixed time and enough for longitudinal entrainment of any object deposited thereon to the end of its run, no object detection occurs by cutting the light beam "R" projected from the emitter 11 transversely to the movement of the belt 10, it is concluded that there is nothing on the belt and therefore it is determined to stop it. If, on the other side, the existence of an object is detected (for example, a deposition), such object is dragged to fall into the receiving space 7 being detected by the light sensor 14 that projects a beam of light from the emitter to the receiver on the opposite side wall. Thus, the start up of the coil 12 is determined as it has been mentioned, by turning, it pulls the stool toward the central portion and grinds it with its intermediate portion 12a, passing it through openings 13a of the grid 13 for collection.

Further, the invention envisages the use of one or more water jets 15a projected along the receiving space 7, from one or more nozzles 15 incorporated in a side wall of housing 7. These space jets are intended to help degrade the excrements, and also keep clean the coil 12, the grid 13 and the belt 10. preferably, the water sprayed from the nozzle(s) 15 is connected with a reservoir located in the disinfectant inside the body 3 and provided with means of automatic dosing, thereby ensuring that the assembly is maintained clean and disinfected.

After a certain sufficient preset time for the grinding and cleaning of the depositions, the spiral crusher and the jets are stopped automatically. Then, it is checked whether there is any object on the grid 13. If a deposition entered into the disposer, it will have been crushed, leaving the free light beam projected by the light sensor 14 and briefly activating the dosing feed to reward and encourage the animal. If the light beam projected by the light sensor 14 is cut, it means that the object that entered the spiral was not a deposition but any other object unwanted, in which case the system will stop, it will activate a light signal, and it will send an alert message indicating the user to intervene to remove the foreign object that is on the grid and reactivate the system.

Figure 6:
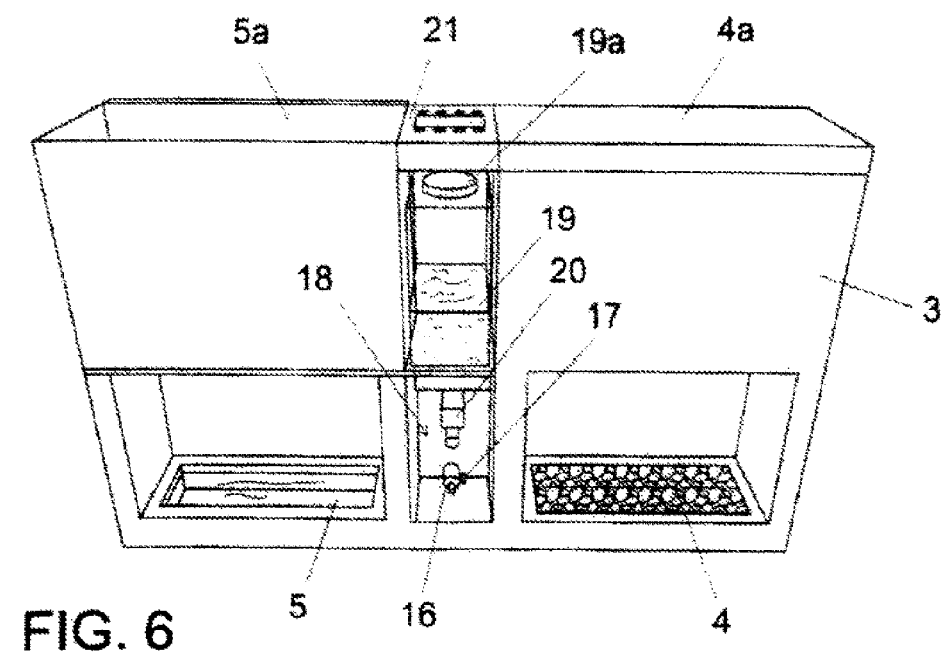
FIG. 6 is an schematic rear view in perspective, of the platform assembly, illustrative of the positions of the feeder, sprue and water level detection means, water drain pump and solenoid valve for the water jets.

Considering now FIG. 6 of the drawings, it is shown a schematic representation of a rear view in perspective of the platform of the present invention. This representation allows us to appreciate the positioning of the trough 4 and the sprue 5 already mentioned, in lower compartments open and easily accessible for the animal, and between them a central compartment 18 rises to slightly less than half the lower dimensions body height, in which elements such as pumping means 16 and a sensor 17 are located. Both the pumping means 16 and the sensor 17 are in communication with the space 7 to which, as explained, both liquids and waste material through shredded the grid 13 can access, so that when the sensor detects in the space 7 a sufficient level of residues, it starts the pump means 16 for extraction and removal thereof. Above this central compartment 18, there is a reservoir 19 containing the disinfectant liquid 19 that is connected to the water supply pipe nozzles supplying water mixed with disinfectant when activated solenoid 20. The disinfectant reservoir is provided a stopper 19a superior for filling the tank, and closing the intermediate portion of the rear body 3 at the top, there is provided a control unit 21 in a position of easy access to the user.

Figure 7:
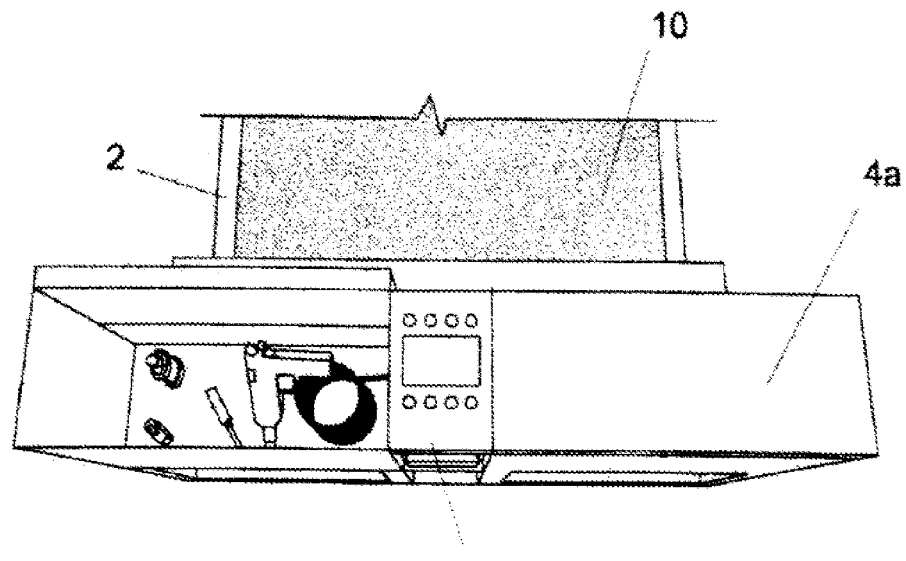
FIG. 7 is an illustrative view of a detail related to the incorporation of a compartment with washing and cleaning tools for cleaning the animal and the platform itself.

The compartment located above the trough 4 is internally hollow and it can be accessed via a cap 4ta superior, being adapted to contain feed from which it is supplied at the prescribed time, to the trough 4. On he other hand, the compartment 5a superimposed on the sprue 5, has been conceived as a small closet, intended to contain within it a multiplicity of items and tools necessary to keep the animal in perfect conditions of cleanliness and hygiene, including a cleaning hose with a spray device water at its end, shampoo, brushes, useful or small maintenance tools, etc. Here, said items are properly protected, out of reach of the animal. The arrangement may be better appreciated in FIG. 7 of the drawings.

Figure 8:
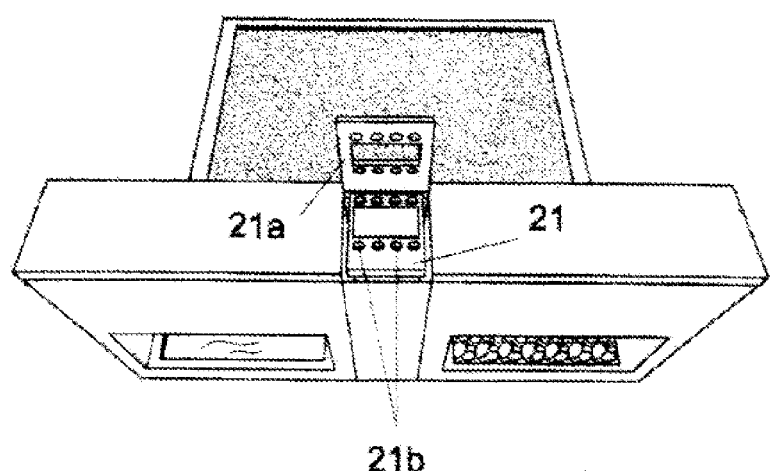
FIG. 8 is a schematic view, from a rear upper position, of the assembly platform equipped with a control unit and programming element accessible to the user.

Finally, as it has been mentioned, the platform assembly also includes a control unit 21 as depicted in FIG. 8 of the drawings. This control unit 21 is closed by a collapsible lid 21a and includes an LCD display to show the user at any time the operational status of the assembly, being visible through a window in the collapsible lid itself 21a. The unit has a set of buttons 21b that allow the user to perform test operations for the implementation of any operational body of the platform, in order to check the performance and to ensure that cleaning operations are performed normally. The unit is designed for connection to the electricity grid and includes one or more batteries to maintain an autonomous power supply and thus, to be able to maintain the time in case of power failure. It also includes internet connection means for remote control operations with a view to checking operations or configuration. It also includes means of self-check to periodically check the operating status of the assembly and send any signal or warning in the event of failure or malfunction of any kind is detected to a receiver device, including means computer, a mobile phone or any other.

As it will be understood, the platform for pet care and attention, especially dogs, provided by the invention and described above, is a safe and easy handling device with automatic operation, controlled and programmable. Installation can be done anywhere provided there is an electrical outlet to power the whole, a power drinking water net and a deposit of sewage or nearby drain for the disposal of waste into the sewer.

It is not considered necessary to extend the content of this description for a person skilled in the art to understand its scope and the advantages derived therefrom, as well as to carry out the practical realization of its object.

Notwithstanding the foregoing, and since the description made corresponds solely to an example of preferred embodiment, it is understood that within its essentiality many modifications and variations can be introduced in detail, also within the scope of the invention, and that they particularly may affect characteristics such as shape, size or manufacturing materials, or any others that do not alter the invention as it has been described and as defined in the following claims.

The invention claimed is:

1. A platform for pet care and attention, to provide care and attention for a domesticated animal comprising:
   a frame that includes a front body extending horizontally to define a support surface and a rear body generally parallelepiped and extending vertically upward from a first end of said front body;
   wherein the rear body comprises
      a hollow interior defining dual lower compartments therein, a rear wall defining two cavities at a bottom thereof, said cavities open to the outside of the rear body and are accessible to the animal, wherein said cavities are separated by a central lower compartment, and wherein said cavities define a first window including a trough and a second window including a sprue for the animal; and the rear body further comprises two upper compartments accessible from a top side of the rear body, separated by an intermediate housing, wherein at least one of said upper compartments contains feed therein for dispensing into said trough included in said cavity defining said first window, and wherein at least one of said upper compartments is designed as a small closet configured to store items and objects related to the animal maintenance and hygiene, including a hose with a sprayer at the hose's end for washing the animal and washing the apparatus itself as a whole, and wherein the intermediate housing separating said upper compartments further comprises a reservoir containing a disinfectant liquid, wherein the front body further comprises
- a conveyor belt assembly comprising an artificial turf belt extended between rotating rollers at either end of the front body located above a tray constituting a bottom of said front body, wherein said rotating rollers configured to be automatically actuated and controlled to cause the conveyor belt to rotate;

wherein the central lower compartment separating the first and second windows of the rear body is positioned below the intermediate housing and houses a solenoid valve connected to a network of water supply pipe nozzles, a sensor that detects a level of residues and a pumping device for pumping water with disinfectant from the reservoir, a receiving space is defined transversely in an area of contact between the front body and the rear body and comprises a waste cavity into which animal waste are entrained and other residues through the belt, further comprising:
- a coil positioned within the waste cavity and rotatable therein and configured to fraction and degrade the animal waste entering the waste cavity carried by the conveyor belt assembly and wherein the coil extends in a direction transversally to said conveyor belt assembly and is located above a grid defining a bottom of the waste cavity;
- wherein said coil comprises singular spiral with at least two portions wound in opposite directions that converge toward an intermediate portion thereof such that waste is funneled toward the middle of said waste cavity; and the receiving space further comprising a first sensor means located near an output end of the conveyor belt, for detection of any material or substance entrained by the conveyor belt, said sensor means comprising a first emitter that projects a first light beam transversely from a sidewall of the front body and is detected by a first receiver facing the emitter located on an opposite sidewall of the front body;

the receiving space also comprising a second light sensor positioned within the waste cavity near the coil for detection of any material or substance entrained into the waste cavity of the receiving space, the second light sensor projects a second beam of light from a second emitter located adjacent one of said sidewalls and facing a second receiver located on the opposite sidewall of the front body; and, a control unit in electrical communication with the conveyor belt assembly, pumping device, solenoid valve, coil and sensors and configured for automatically controlling, detecting and actuating said platform components.

2. The platform according to claim 1, further comprising one or more nozzles located on the sides of the space or cavity from which water jets are projected when the second light sensor detects a sufficient level of waste on the grid.

3. The platform according to claim 1, further comprising wherein said control unit is located at the top of the housing separating both compartments, closed by a collapsible lid and equipped with a multiplicity of keys for the selection of functions by the user.

4. The platform according to claim 1, further comprising means of self-check to periodically check the operating status of the assembly and send any signal or warning in the event of failure or malfunction is detected to a receiver device, including means computer, a mobile phone or any other.

* * * * *